(No Model.)

J. NUTTALL.
PIPE COUPLING.

No. 353,580. Patented Nov. 30, 1886.

WITNESSES:
Darwin S. Wolcott
C. M. Clarke

INVENTOR,
Joshua Nuttall
George H. Christy Att'y

N. PETERS, Photo-Lithographer, Washington, D. C.

UNITED STATES PATENT OFFICE.

JOSHUA NUTTALL, OF PITTSBURG, PENNSYLVANIA.

PIPE-COUPLING.

SPECIFICATION forming part of Letters Patent No. 353,580, dated November 30, 1886.

Application filed May 15, 1886. Serial No. 202,231. (No model.)

*To all whom it may concern:*

Be it known that I, JOSHUA NUTTALL, residing at Pittsburg, in the county of Allegheny and State of Pennsylvania, a citizen of the United States, have invented or discovered certain new and useful Improvements in Pipe-Couplings, of which improvements the following is a specification.

Figure 1:
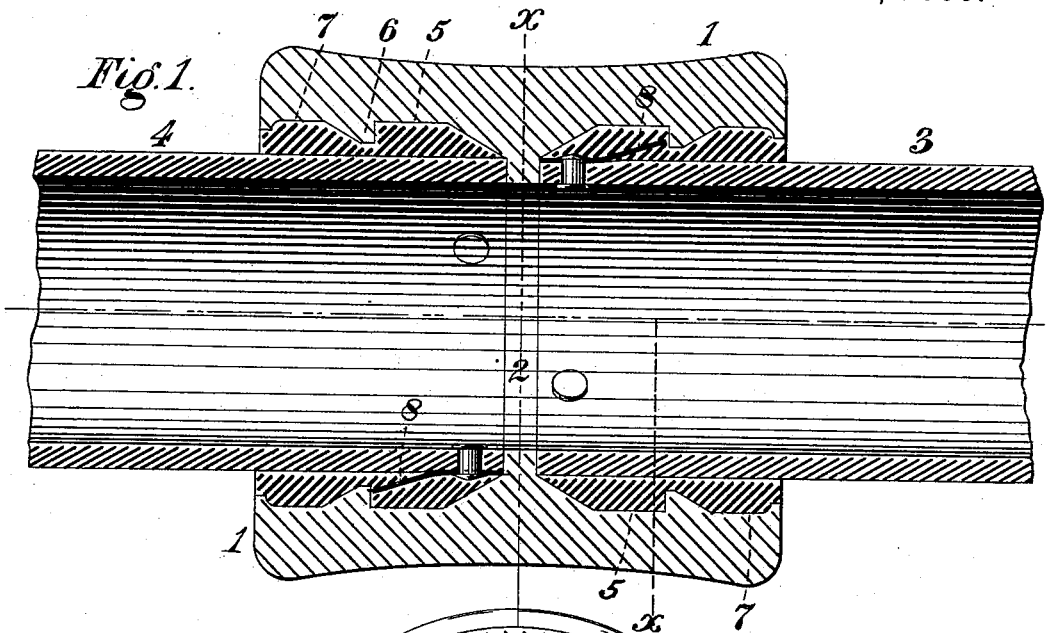
Figure 2:
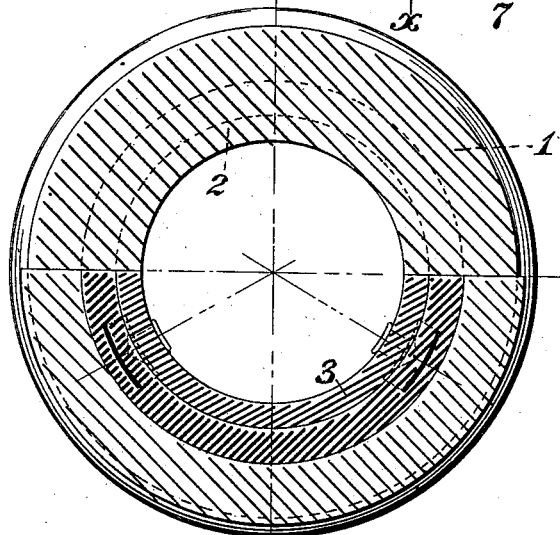
Figure 3:
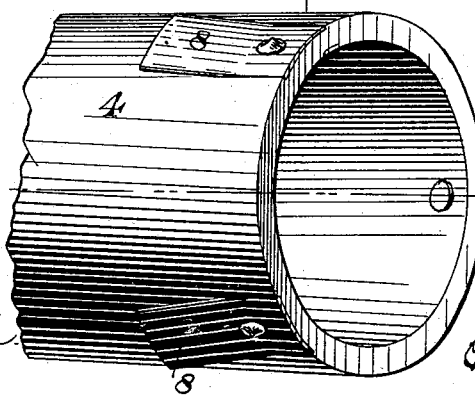

In the accompanying drawings, which make part of this specification, Figure 1 is a longitudinal sectional view of a portion of a pipe-line embodying my invention. Fig. 2 is a transverse sectional view on the line *x x*, Fig. 1. Fig. 3 is a perspective view of the end of a pipe-section.

The invention herein relates to certain improvements in couplings for pipes for the conveyance of gas and other fluids, and has for its object the formation of a tight and rigid joint without the use of screw-threads or other analogous construction, which involves a weakening of the pipe section or coupling, to produce a tight joint.

In general terms the invention consists in the construction and combination of parts, substantially as hereinafter described and claimed.

The coupling-collar 1, which is cast to shape, or may be formed by forging or rolling, is provided midway of its length with a continuous bead or projection, 2, forming a shoulder, against which the adjacent ends of the pipe-sections 3 and 4 abut, said bead or shoulder being of a height equal to the thickness of the pipe-walls, thereby forming a continuous smooth surface between the pipe-sections.

On each side of the bead or shoulder 2 is formed a groove or recess, 5, for the reception of lead or other suitable packing material, the outer wall of said recess being made vertical, or practically so, as shown at 6 in Fig. 1. Outside of the recesses 5, or near the ends of the coupling-sleeve, may be formed additional recesses or grooves, 7, for the reception of lead or other suitable packing, as shown.

On the ends of the pipe-sections are secured the spring-fingers or stops 8, the free ends of such springs projecting towards the middle of the pipe, as shown. These springs are so located, or are made of such a length, as to spring into the recesses or grooves 5 and engage the vertical wall 6 when the pipe-sections are pushed within the coupling-sleeve or collar, as clearly shown in Fig. 1. The lead packing is then poured into the space between the sleeve and the end of the pipe, completely filling the grooves or recesses 5 and 7, said packing being thoroughly calked therein, as is the usual practice. The lead entering in between the spring and the wall of the pipe will prevent any inward movement of the free ends of the springs necessary for a removal of the pipe-section from the sleeve or collar.

It will be observed that in my improved form of coupling no rotation of the pipe or sleeve is necessary in order to lock the same together, the locking being effected by thrusting one within the other. It is a further characteristic of the invention herein that the coupling once made cannot be broken without melting out the lead packing or destroying the sleeve or collar.

I am aware that hose-couplings have been made having one part formed with an internal groove with which a hooked spring on the other part or member of said coupling engages a portion of said spring near the rear end thereof, being exposed when the coupling is formed, so as to permit of a depression of the spring and the consequent disengagement of the hooks from the other part or member.

I claim herein as my invention—

1. In a pipe-coupling, the combination of a sleeve or collar having an internal groove with a continuous outer wall and a pipe-section provided with springs constructed to engage the outer wall of said groove, and to be entirely inclosed by the collar when the pipe-section is thrust within the collar, substantially as set forth.

2. In a pipe-coupling, the combination of a sleeve or collar having an internal groove with a continuous outer wall and a pipe-section provided with springs having their free ends projecting rearwardly or away from the ends of the pipe-section, said springs engaging the outer wall of the groove and being entirely inclosed by the collar when a coupling is formed, substantially as set forth.

3. In a pipe-coupling, the combination of a sleeve or collar having an internal groove, 5, and an additional calking-groove, 7, a pipe-section provided with springs constructed to engage the outer wall of the groove 5, and a lead packing filling the grooves 5 and 7, substantially as set forth.

In testimony whereof I have hereunto set my hand.

JOSHUA NUTTALL.

Witnesses:
  DARWIN S. WOLCOTT,
  W. B. CORWIN.